United States Patent [19]

Schlegel

[11] E Re. 29,708

[45] Reissued Jul. 25, 1978

[54] DECANTER HANDLE STRUCTURE

[75] Inventor: Norman H. Schlegel, Chicago, Ill.

[73] Assignee: Cory Food Services, Inc., Chicago, Ill.

[21] Appl. No.: 740,831

[22] Filed: Nov. 11, 1976

Related U.S. Patent Documents

Reissue of:

[64] Patent No.: 3,717,288
Issued: Feb. 20, 1973
Appl. No.: 126,853
Filed: Mar. 22, 1971

[51] Int. Cl.[2] ..... A47B 95/02

[52] U.S. Cl. ..... 222/465; 16/114 A; 215/100 A

[58] Field of Search ..... 222/465, 470–473; 294/31.2; 215/100 A; 16/114 A

[56] References Cited

U.S. PATENT DOCUMENTS

| | | | |
|---|---|---|---|
| 679,742 | 8/1901 | Goddard | 16/114 |
| 1,446,474 | 2/1923 | Mahnken | 215/100 A |
| 1,681,598 | 8/1928 | Saunders | 222/465 |
| 2,049,219 | 7/1936 | Muschinske et al. | 222/465 |
| 3,458,164 | 7/1969 | Massey | 220/85 H |

*Primary Examiner*—Allen N. Knowles
*Assistant Examiner*—David A. Scherbel
*Attorney, Agent, or Firm*—Wegner, Stellman, McCord, Wiles & Wood

[57] ABSTRACT

A one-piece plastic handle structure for supporting a glass decanter such as for dispensing coffee and similar liquids. The handle structure is adapted to be removably engaged with the glass decanter and includes means for releasably embracing the decanter neck and means for protecting the bowl portion of the decanter bowl from injury.

1 Claim, 9 Drawing Figures

P
11
10
15
18
16
14
12

18
25
10
17
20
21
20
18
24
28
19

16
22
25
10
14
18
17
11
19
24
23
13

19
18
22
17
21
26
23
27
25
18

Fig. 5.
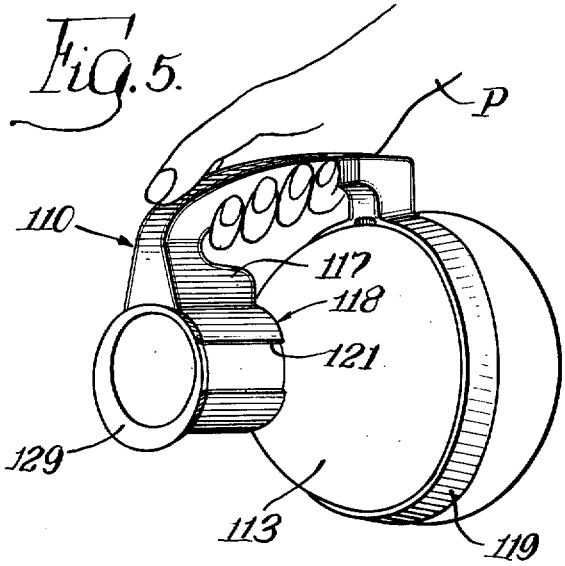
Fig. 6.
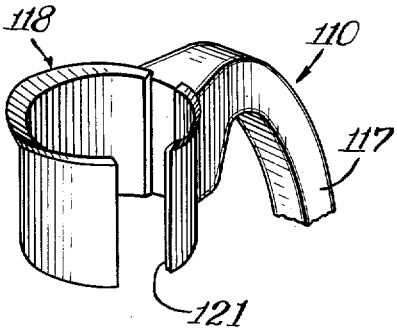
Fig. 7.
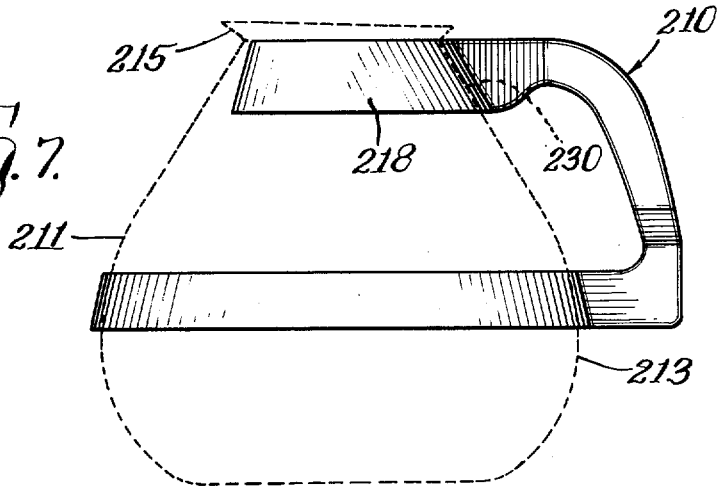
Fig. 8.
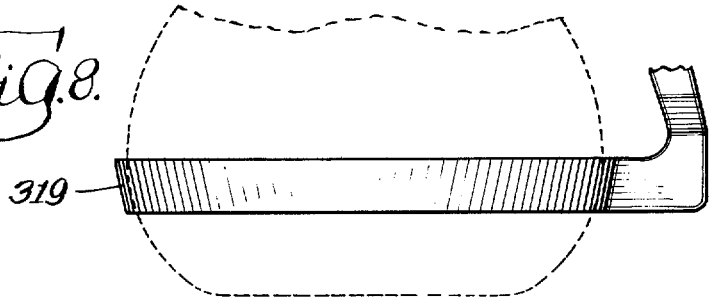
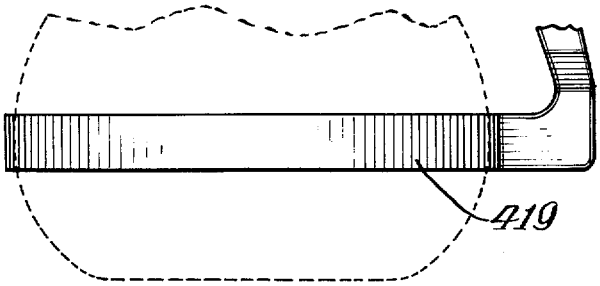
Fig. 9.

DECANTER HANDLE STRUCTURE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to pouring devices and in particular to handle structures for use with decanters.

2. Description of the Prior Art

In U.S. Pat. No. 2,554,367 issued to Harvey R. Karlen for a Beverage Brewer and owned by the assignee hereof, a glass decanter D is illustrated for use in dispensing coffee or similar beverage produced by the brewer. As shown, a handle is secured to the neck of the decanter by means of a suitable band encircling the neck of the decanter. In U.S. Letters Pat. No., 2,982,451 issued to David C. Eisendrath for a Decanter, also owned by the assignee hereof, a modified form of decanter is shown to include a neck terminating at an upper portion on which a plastic spout is mounted and which is retained in association with the decanter neck by a band encircling the spout and neck and also serving to connect the handle to the decanter.

In a still further form of beverage disperser shown in U.S. Letters Pat. No. 2,552,420 issued to S. H. Frankel and owned by the assignee hereof, a handle is shown to be secured to a metal decanter bowl by screw means.

SUMMARY OF THE INVENTION

The present invention comprehends an improved removable handle structure adapted to be readily removably secured to a decanter having a globular bowl portion and a tubular neck upstanding from the bowl portion and terminating in an upper pouring spout.

The handle structure comprises a carrier having a handle portion adapted to be grasped for manual carrying of the decanter by a user. Gripping elements are provided on the upper end of the handle portion adapted to be biased into firm embracing relationship with the neck of the decanter. At the lower end of the handle is carried an annular band adapted to encircle the bowl portion of the decanter bowl for protecting the bowl portion against injury as from striking forces directed theretoward.

The handle structure comprises a unitary element which may be formed as a one-piece plastic molding which is extremely simple and economical of construction while yet providing a positive means for carrying the decanter such as for use in dispensing beverage therefrom. The handle structure may be quickly and easily removably installed on the conventional glass decanter permitting facilitated maintenance as desired.

BRIEF DESCRIPTION OF THE DRAWING

Other features and advantages of the invention will be apparent from the following description taken in connection with the accompanying drawing wherein:

FIG. 5 is a fragmentary perspective view of a beverage dispensing decanter having a modified form of handle structure embodying the invention;

FIG. 6 is a fragmentary enlarged perspective view of the modified handle structure of FIG. 5;

FIG. 7 is a side elevation of a beverage dispensing decanter having a further modified handle structure embodying the invention;

FIG. 8 is a fragmentary side elevation of a beverage dispensing decanter having a still further modified handle structure embodying the invention; and FIG. 9 is a fragmentary side elevation of a beverage dispensing decanter having a yet further modified handle structure embodying the invention.

DESCRIPTION OF THE PREFERRED EMBODIMENTS

Figures 1, 2, 3, 4:
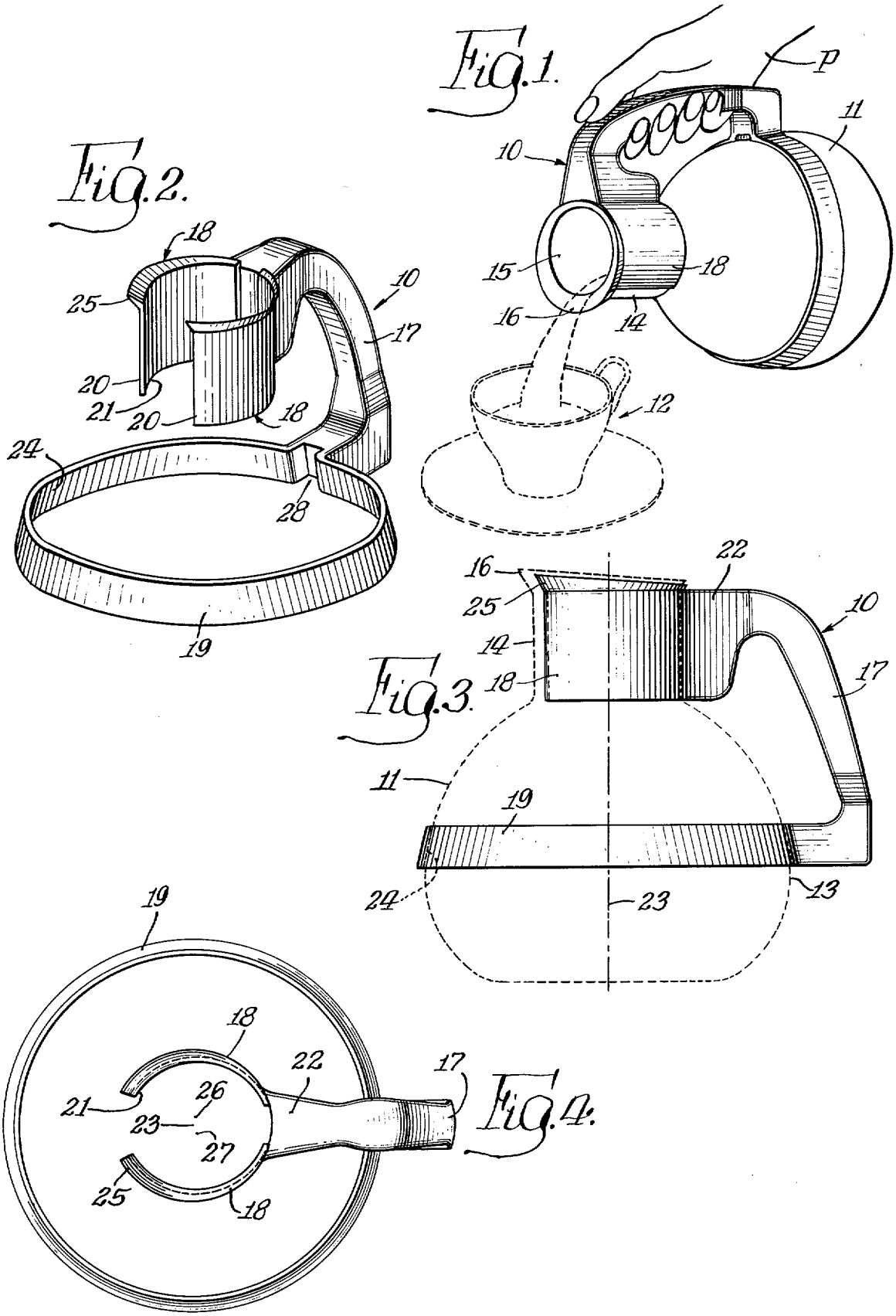
FIG. 1 is a perspective view of a beverage dispensing decanter having a handle structure embodying the invention as used in dispensing a beverage from the decanter.
FIG. 2 is an enlarged perspective view of the handle structure.
FIG. 3 is a side elevation thereof.
FIG. 4 is a top plan view thereof.

In the exemplary embodiment of the invention as disclosed in FIGS. 1–4 of the drawing, a handle structure, or carrier, generally designated 10 embodying the invention is shown as adapted for use with a decanter 11 for manipulation of the decanter such as in dispensing a brewed beverage therefrom. The decanter, illustratively may be utilized in dispensing brewed coffee into a suitable cup 12 by a user P manually grasping the handle structure.

Decanter 11 may comprise a conventional glass decanter having a globular bowl portion 13 and a tubular neck 14 upstanding from the bowl portion and terminating in an upper distal outturned portion 15 defining a pouring spout 16.

As best seen in FIG. 2, handle structure 10 includes a handle portion 17 adapted to be manually grasped by the user to manually carry the decanter. At the upper end of the handle portion is provided gripping means herein comprising a pair of gripping elements 18 defining spaced distal arcuate portions biased into juxtaposed relationship suitable for yieldingly, firmly embracing neck 14 of the decanter. At the lower end of the handle portion 17, handle structure 10 defines an annular band having a diameter preselected to snugly embrace bowl portion 13 of the decanter for cooperating with gripping elements 18 in stabilizing the handle in retained association with the decanter. Further, annular band 19 protects bowl portion 13 of the glass decanter against injury such as from striking forces directed theretoward.

Handle structure 10 herein comprises a unitary element including handle portion 17, gripping elements 18, and band 19 formed as a one-piece structure. Thus, illustratively, the handle structure may be formed of substantially homogeneous synthetic plastic material as a plastic molding.

As best seen in FIG. 4, gripping elements 18 may comprise segmentally cylindrical walls. The curvature of the gripping elements is preferably preselected to be generally similar to the curvature of the decanter neck 14 to provide a firm embracing of the decanter neck in the assembled relationship of the handle structure and decanter, as shown in FIG. 1. In the embodiment of FIGS. 1–4, arcuate gripping elements 18 include corresponding outer ends 20 which are inturned toward each other. Preferably, a gap 21 is provided between the inturned ends to facilitate mounting of the gripping elements on the decanter neck. A suitable angular extent of gap 21 may be utilized within the scope of the invention. In the illustrated embodiment, a 60° extent of gap 21 is shown to provide a facilitated mounting of the gripping elements on the decanter neck of FIG. 1 while yet providing a positive encircling embracing of the neck for firm mounting of the handle structure to the decanter.

Handle portion 17 comprises an elongated, substantially straight portion having a relatively thick connecting means 22 at the upper end connecting gripping elements 18 to the handle portion. The handle may extend angularly to the axis of the annular band and arcuate portions 18 for facilitating handling of the decanter by the user. Arcuate portions 18 preferably have a substantial height parallel to axis 23 and in the illustrative embodiment, extend substantially the full length of the decanter neck. Portions 18 preferably extend at least one-half the length of the decanter neck for improved gripping of the decanter neck by the gripping elements. The upper edge 25 of the gripping elements may be outturned to correspond to the outturned portion 15 of the decanter necks, if desired, as shown in FIG. 3, for improved support of the decanter by the handle structure. Gripping elements 18 are generally coaxially spaced from the annular band a distance preselected to dispose the annular band adjacent a position of maximum diameter of the globular bowl portion of the decanter when the handle structure is mounted on the decanter, as shown in FIG. 1. The gripping elements may have a height substantially greater than the height of the annular band. The annular band may be arranged to extend upwardly from the maximum diameter portion of the band and may define a substantially frustoconical inner surface 24 for improved conformity with the outer surface of the bowl portion of the decanter, as shown in FIG. 3, thereby to provide improved stability of the handle structure in carrying the decanter.

In use, handle structure 10 is installed on decanter 11 by firstly moving band portion 19 downwardly over neck 14 of the decanter with the handle structure titled to bring gripping elements 18 to laterally of neck 14 opposite pouring spout 16 thereof. The handle structure is then urged forwardly to spread the gripping elements and permit end portions 20 to pass about the maximum diameter of the neck portion and spring back about the neck portion adjacent pouring spout 16 thereby effectively locking the handle structure to the decanter. The band is automatically disposed adjacent the maximum diameter of the bowl portion for protecting the bowl against injury as from striking forces. The gripping elements are prevented from moving upwardly from decanter neck 14 by the outturned upper end 15 thereof thereby effectively interlocking the handle structure to the decanter.

As shown in FIG. 4, the gripping elements herein may have a curvature slightly smaller than the curvature of the decanter neck. One gripping element may be centered on an axis 26 and the other gripping element may be centered on an axis 27 spaced from axis 26 and from axis 23. Thus, the gripping elements provide a resilient gripping of the decanter neck when urged thereagainst. Further as shown in FIG. 2, band 19 may be provided with a gap 28 at the connection thereof to the lower end of handle 17 providing for limited resilient extension of the band in providing improved gripping action about the decanter bowl.

As the handle structure is formed of a suitable molded plastic, it may be readily cleaned with the glass bowl in the normal maintenance procedures thereof. Should the decanter break or become chipped, warranting the disposal thereof, the handle structure may be readily removed by an operation reverse to that described above relative to the installation thereof on the decanter, i.e., by tilting the handle structure rearwardly to withdraw gripping elements 18 from embracing relationship from the decanter neck 14 and bringing the annular band upwardly over neck 14 to fully release the handle structure from the decanter. The handle structure may then be installed on a different decanter, as desired.

Referring now to the embodiments of FIGS. 5 and 6, a modified form of handle structure embodying the invention generally designated 110 is shown to comprise a handle structure generally similar to handle structure 10 but having a modified form of gripping means 118 wherein the gap 121 is disposed at the side of the gripping means, i.e., intermediate the handle 117 and the portion 129 of the gripping means most remote from the handle. Thus, portion 129 extends under the lowermost portion of the decanter neck when the beverage dispensing decanter structure is disposed in the pouring arrangement, as shown in FIG. 5.

Installation of handle structure 110 on the decanter bowl 113 is generally similar to the installation of handle structure 10 thereon except that the handle is turned sideways as the band portion 119 is brought downwardly onto the bowl and urged about the decanter neck from the side when the band reaches the approximate final position of the bowl. In all other respects, handle structure 110 is similar to and functions similarly to handle structure 10 as discussed above.

A further modified form of handle structure generally designated 210 is shown in FIG. 7 to comprise a handle structure generally similar to handle structure 10 but having a gripping means generally designated 218 adapted to cooperate with a modified form of decanter bowl 213 having a flared distal upper end 215 defining the spout connected substantially directly to the bowl portion 213 so that decanter 211 effectively eliminates a neck structure such as neck structure 14 of decanter 11. Gripping means 218 may comprise cooperating gripping elements adapted to engage the upper portion 230 of the decanter bowl subjacent the flared upper end 215 and may comprise any suitable arrangement of gripping means such as end opening gripping means 18 of handle structure 10, or side opening gripping means 118 of handle structure 110.

Handle structure 210 may be installed on decanter bowl 213 similarly as handle structures 10 and 110 as discussed above. In all other respects, handle structure 210 is similar to and functions similar to handle structures 10 and 110.

The invention comprehends a disposition of the annular band 19 suitably to encircle the decanter bowl portion 213 adjacent the maximum diameter thereof in the different embodiments. Further, the band may be arranged to encircle the bowl directly at or subjacent the maximum diameter, as shown in FIGS. 9 and 8, respectively, within the scope of the invention. Where the band is adapted to engage the bowl below the maximum diameter thereof, such as band 319 as shown in FIG. 8, the band may be brought upwardly from the bottom of the bowl and the gripping means engaged with the upper portion of the decanter after the band is disposed substantially at the desired position. During such mounting, the gripping means or handle may be flexed backwardly to clear the bowl. Where the band comprises a band such as band 419 in FIG. 9, having a diameter substantially equal to the diameter of the maximum diameter of the bowl, the band may be brought either downwardly or upwardly to the maximum diameter portion of the bowl as desired. In each case, the band is juxtaposed to the maximum diameter of the bowl so as to provide a protecting guard thereabout substantially reducing maintenance of the decanter.

The foregoing disclosure of specific embodiment is illustrative of the broad inventive concepts comprehended by the invention.

I claim:

[1. For use with a glass decanter having a globular bowl portion terminating in an upper distal outturned portion defining a pouring spout, a handle structure comprising a one-piece element defining a handle adapted to be grasped for manually carrying the decanter, a pair of arcuate gripping means having connecting portions fixedly connected to a common fixed upper portion of the handle and defining deflectible gripping portions spaced apart forwardly of said handle upper portion and extending at least approximately 270° whereby said gripping means is adapted for yieldingly firmly embracing the decanter subjacent said pouring spout, and an annular band extending in a continuous arc from a lower portion of the handle and having a large diameter preselected to embrace and protect the bowl portion of a decanter at the portion thereof having largest horizontal cross section for cooperation with said gripping elements in stabilizing the handle in retained association with the decanter, said element being formed of a material having limited resilience, the opening of said annular band being unobstructed axially thereof whereby said handle structure is mountable on said decanter by firstly moving said annular band vertically about the decanter to said decanter portion of largest cross section and then swinging the gripping means to embrace laterally opposed portions of said upper decanter portion below said pouring spout.]

[2. The decanter handle structure of claim 1 wherein said carrier is formed of substantially homogeneous synthetic plastic material.]

[3. The decanter handle structure of claim 1 wherein said gripping means comprise arcuate walls having a curvature preselected to be generally similar to the curvature of the decanter subjacent said upper portion.]

[4. The decanter handle structure of claim 1 wherein said handle comprises an elongated, substantially straight portion of said handle structure.]

[5. The decanter handle structure of claim 1 wherein said handle extends angularly to the axis of said annular band.]

[6. The decanter handle structure of claim 1 wherein said portions of the gripping means are arcuate and axially parallel, and said handle extends angularly thereto.]

[7. The decanter handle structure of claim 1 wherein said gripping means define similar arcuate elements inturned toward each other.]

[8. The decanter handle structure of claim 7 wherein said inturned elements extend at least approximately 60° toward each other.]

[9. The decanter handle structure of claim 1 wherein said decanter includes a tubular neck subjacent said outturned portion and said gripping means has a height parallel to the lengthwise extent of said decanter neck at least one-half said lengthwise extent.]

[10. The decanter handle structure of claim 1 wherein said gripping means is arcuate and said annular band and gripping means are generally coaxially spaced.]

[11. The decanter handle structure of claim 10 wherein said arcuate gripping means has a height parallel to the axis thereof substantially greater than the height of said annular band parallel to said axis.]

[12. The decanter handle structure of claim 1 wherein said gripping means extends downwardly from said outturned portion of the decanter to overlie said bowl portion.]

[13. The decanter handle structure of claim 1 wherein said gripping means is provided with an outturned upper edge adapted to engage the underside of the distal outturned portion of the decanter.]

[14. The decanter carrier of claim 1 wherein said gripping elements comprise a pair of segmentally cylindrical walls having a radius slightly smaller than the radius of curvature of the decanter neck, said wall being resiliently spread by the engagement thereof with the decanter neck to provide the firm embracing of the neck thereby.]

[15. The decanter carrier of claim 14 wherein the axes of curvature of the respective segmentally cylindrical walls are spaced from each other.]

[16. The decanter carrier of claim 14 wherein the axes of curvature of the respective segmentally cylindrical walls are spaced closely adjacent the axis of the annular band.]

[17. The decanter carrier of claim 1 wherein the annular band is provided with spaced end portions joined to said handle and defining a gap in the annular configuration thereof permitting limited circumferential extensibility of the band in accommodating itself to the configuration of the bowl portion of the decanter.]

[18. The decanter handle structure of claim 1 wherein said gripping means comprises means for partially encircling the decanter neck having a gap intermediate the handle and a portion of the gripping means spaced most remotely from the handle.]

[19. The decanter handle structure of claim 1 wherein said gripping means comprises means for partially encircling the decanter neck having a gap at a portion of the gripping means spaced most remotely from the handle.]

[20. The decanter handle structure of claim 1 wherein said annular band is spaced from said gripping means a distance preselected to dispose the annular band superjacent a position of maximum diameter of the globular bowl portion of the decanter with the gripping means disposed about the decanter subjacent said outturned portion of the decanter.]

[21. The decanter handle structure of claim 1 wherein said annular band is spaced from said gripping means a distance preselected to dispose the annular band subjacent a position of maximum diameter of the globular bowl portion of the decanter with the gripping means disposed about the decanter subjacent said outturned portion of the decanter.]

[22. The decanter handle structure of claim 1 wherein said annular band is spaced from said gripping means a distance preselected to dispose the annular band accurately about the maximum diameter of the globular bowl portion of the decanter closely with the gripping means disposed about the decanter subjacent said outturned portion of the decanter.

*23. For use with a glass decanter having a globular bowl portion terminating in an upper distal outturned portion defining a pouring spout, a handle structure comprising a one-piece element defining a handle adapted to be grasped for manually carrying the decanter, a pair of arcuate gripping means having connecting portions fixedly connected to a common fixed upper portion of the handle and defining deflectible gripping portions spaced apart forwardly of said handle upper portion and extending at least approximately* 270° *whereby said gripping means is adapted for yieldingly firmly embracing the decanter subjacent said pouring spout, and an annular band extending in a continuous arc from a lower portion of the handle and having a large diameter preselected to embrace and protect the bowl portion of a decanter at the portion thereof having largest horizontal cross section for cooperating with said gripping elements in stabilizing the handle in retained association with the decanter, said element being formed of a material having limited resilience, the opening of said annular band being unobstructed axially thereof whereby said handle structure is mountable on said decanter by firstly moving said annular band vertically about the decanter to said decanter portion of largest cross section and then swinging the gripping means to embrace laterally opposed portions of said upper decanter portion below said pouring spout, said gripping portions each defining a segmentally cylindrical lower portion and an outturned upper end portion, said upper portion of the handle having a height equal to that of said cylindrical portion and being spaced radially outwardly of said upper decanter portion by said connecting portions of the gripping means, said handle upper portion defining a planar top surface and a stepped lower surface, said handle including a grasping portion defining an upper surface continuing uninterruptedly outwardly and downwardly from said planar top surface, said grasping portion and upper handle portion further defining a U-shaped downwardly opening recess spaced outwardly of the connecting portions of the gripping means by at least approximately half the outward extent of the handle upper portion away from said connecting portions.*

* * * * *